Patented July 20, 1943

2,324,471

UNITED STATES PATENT OFFICE 2,324,471

FUMIGANT MIXTURE

William W. Allen and Joseph Carl Dawson, Midland, Mich., assignors to The Dow Chemical Company, Midland, Mich., a corporation of Michigan No Drawing. Application October 17, 1941,
Serial No. 415,408

4 Claims. (Cl. 99—225)

The present invention relates to new and improved fumigant mixtures and to a method for fumigating insect infested grain.

Many low boiling and volatile organic liquids have been suggested as fumigants, and carbon tetrachloride, methyl bromide, ethylene chloride and the like are widely employed for the control of insect pests. These compounds vary considerably as to physical characteristics whereby in many instances the use of a given substance is limited to a particular type of fumigation procedure.

With increased inventories of surplus grains, the control of weevils and related insect pests has become a problem of major importance. The stored grain is generally held in bins or granaries for periods running from one season to several years and frequently become so badly infested with weevils, beetles, and the like as to be of little value for human consumption.

Much time and money has been expended by both governmental and private agencies in an effort to evolve control methods for grain infesting insects. The amounts of many of the known fumigants required to accomplish such control are so large that the cost of treatment is prohibitive. Furthermore, the controls obtained with such toxicants are frequently erratic and unsatisfactory even at relatively high concentrations due to variations in stored grain temperatures, and problems of penetration, vapor distribution, and channelling.

According to the present invention, improved fumigant mixtures are provided which comprise as a major toxic ingredient a propylene chloride mixture containing a substantial amount of methyl bromide. The expression "substantial amount" as herein employed refers to from about 3 to about 50 per cent by weight. In view of the disparity between the densities of propylene chloride and methyl bromide, on a volume basis the propylene chloride predominates in such mixtures. These new fumigants have been found superior with respect to their control of grain parasites, particularly in bin fumigations. A further advantage resides in the fact that with such compositions the use of pressure containers and special applicators as required with methyl bromide alone is substantially eliminated. This results from a lowering of the vapor pressure and a reduction of the rate of vaporization attributable to the large proportions of propylene chloride employed.

The invention also provides a procedure whereby grain stored in bins is treated with the new propylene chloride-methyl bromide mixtures to obtain an economical and efficient control of weevils, borers, and beetles. This procedure comprises introducing the fumigant mixture at the top of a filled bin, granary, elevator, etc. and onto the surface of the grain. The vapor pressures of the new mixtures are such that a gradual distribution and penetration of the toxic vapor occurs throughout the limits of the confining structure with the substantial absence of the undesirable channelling effect ordinarily observed with methyl bromide and the localized control inherent to propylene chloride.

The amounts of the new compositions required to accomplish control of insects at all levels of the stored grain are relatively small and it appears that an effect is exerted by the mixture of toxicants which is much greater than the sum of the toxicities of the constituents. Thus from about 1 to about 3 gallons of the propylene chloride-methyl bromide mixture per 1000 bushels of grain give commercial control of insect pests. When used alone, amounts of each constituent in excess of those required in the mixture frequently are not satisfactory.

The following table sets forth the results obtained on corn with a representative propylene chloride-methyl bromide mixture and with propylene chloride and methyl bromide alone. The organism concerned was *Tribolium confusum*, i. e. the confused flour beetle.

Table

| Fumigant material | Lbs./1000 bushels | Per cent control at various levels below surface of grain | | | | | |
|---|---|---|---|---|---|---|---|
| | | Surface | 1.5 ft. | 3.5 ft. | 4.5 ft. | 6.5 ft. | 9.5 ft. |
| Propylene chloride<br>Methyl bromide | 17.32 } 20.2<br>2.88 | 100 | 100 | 100 | 100 | 100 | 100 |
| Propylene chloride | 19.4 | 100 | 100 | 100 | 34 | 0 | 0 |
| Methyl bromide | 5 | 10 | 0 | 6 | 8 | 2 | 100 |

In carrying out the fumigations which resulted in the foregoing data, cages containing a definite number of test insects were introduced into a bin at the surface of and at different levels in the stored corn. The fumigants were applied at the top of the bin by sprinkling on the surface of the grain. Each bin was thereafter closed and allowed to stand for three days. The cages were then removed from the several levels and the degree of control calculated on the basis of observed insect mortality.

The following compositions are representative of preferred mixtures falling within the scope of the present invention.

Composition A

| | |
|---|---|
| Proplyene chloride | 90 gallons |
| Methyl bromide | 10 gallons |

Composition B

| | |
|---|---|
| Propylene chloride | 67.5 gallons |
| Carbon tetrachloride | 22.5 gallons |
| Methyl bromide | 10 gallons |

The foregoing compositions are effective not only against the confused flour beetle but also against such insects as rice and granary weevils, the lesser grain borer, larvae, pupae, and eggs of the Indian-meal moth, and the like. Similarly wheat, rye, barley, oats, rice, and the like may be treated as herein described.

If desired, other organic liquids may be incorporated into the mixtures as disclosed to serve either as carriers for the propylene chloride-methyl bromide mixture or as added toxicants. Representative of such materials are ethylene chloride, trichloro ethylene, ethylene chlorobromide, propylene chlorobromide, chloroform, chloropicrin, ethylene oxide, etc.

We claim:

1. In a method for fumigating insect infested grain stored in bins the step of introducing a volatile fumigant comprising as a major toxic ingredient a mixture of propylene chloride with a substantial proportion of methyl bromide in the top of the bin and onto the surface of stored grain.

2. A volatile liquid fumigant comprising a mixture of propylene chloride with a substantial proportion of methyl bromide.

3. A volatile liquid fumigant consisting of carbon tetrachloride and as a major toxic ingredient a mixture of propylene chloride with a substantial proportion of methyl bromide.

4. A volatile liquid fumigant consisting of a mixture of propylene chloride and methyl bromide, and a volatile liquid carrier therefor.

WILLIAM W. ALLEN.
JOSEPH CARL DAWSON.